Figure 1:
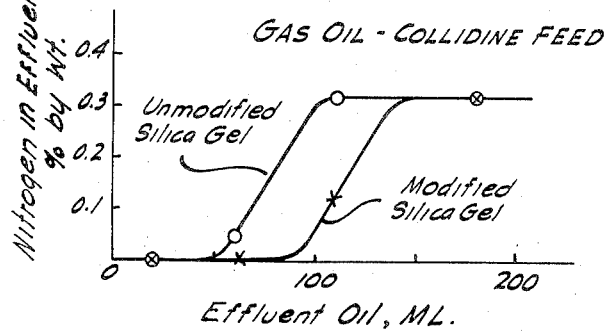

United States Patent Office 2,763,603
Patented Sept. 18, 1956

2,763,603

PREPARATION AND USE OF SPECIFIC ADSORBENTS

Davis A. Skinner, Compton, Calif., assignor to Union Oil Company of California, Los Angeles, Calif., a corporation of California Application January 12, 1951, Serial No. 205,802

7 Claims. (Cl. 196—147)

This invention relates generally to the preparation and use of solid adsorbents. More particularly, this invention relates to the preparation of solid adsorbents in the presence of a modifier which alters the adsorptive characteristics of the resulting adsorbent whereby an increased specificity is obtained for the adsorption of chemical compounds which are identical with or are closely related to the modifier. The invention further relates to the use of such adsorbents.

In the evaluation of solid adsorbents for separating one or more compounds from a mixture of compounds, two characteristics of the adsorbent are employed, namely, specificity or selectivity and adsorptive capacity. The preferred adsorbents generally have a high specificity for the particular compound to be separated from the mixture and a low adsorption capacity for other compounds of the mixture and will also have a high value for the retention of the compound per unit weight of adsorbent.

It has now been found that where a solid adsorbent is prepared by precipitation or formation in the presence of a modifier which may be either a single chemical compound or a group of compounds, the resulting adsorbent, after removal of the modifier by suitable means, possesses a specific adsorption for either the modifier, or for chemical compounds which are closely related to the modifier, which is considerably higher than that which is obtained without the inclusion of the modifier. The adsorptive capacity of the modified adsorbent is also generally higher than that of the unmodified adsorbent.

It is an object of this invention to prepare adsorbents of increased capacity and specificity for the separation of one or more compounds of a particular chemical class from a mixture containing these compounds and compounds of dissimilar chemical classes.

It is another object of this invention to form solid adsorbents in intimate contact with a modifying compound or compounds so as to increase the specificity of the adsorbent for the separation of compounds which are closely related to the modifying compound or compounds from mixtures containing such compounds.

It is another object of this invention to form an oriented or modified surface on or throughout a solid adsorbent whereby the surface characteristics are such as to favor the adsorption of one group of chemical compounds relative to other related groups of chemical compounds.

It is another object of this invention to separate adsorbable compounds from a mixture and employ the separated compounds as a modifier in the fluid medium employed for the precipitation of a solid adsorbent whereby an adsorbent is obtained, which after the removal of the modifier, possesses a high specificity for the adsorption of the modifier from mixtures containing the modifier.

It is another object of this invention to provide a new method for the preparation of solid adsorbents which are selective for the adsorption of heterocyclic oxygen, nitrogen and sulfur compounds.

It is another object of this invention to prepare solid adsorbents by precipitating inorganic gels in the presence of a modifier selected from the group consisting of nitrogen-containing organic compounds, removing the modifier from the resulting gel, and thereby obtaining a gel possessing high capacity and high selectivity for the removal of nitrogen compounds from petroleum distillates.

It is another object of this invention to separate nitrogen-containing compounds from petroleum distillates and to precipitate a solid adsorbent in the presence of such nitrogen-containing compounds as a modifier whereby an adsorbent is obtained which, after the removal of the modifier, has a high specificity for the resolution of such nitrogen-containing compounds from such distillates.

Other objects and advantages of this invention will become apparent to those skilled in the art as the description thereof proceeds.

Briefly, this invention relates to the preparation of solid adsorbents of high specificity and selectivity and of high capacity by inclusion of a modifier during the formation of the adsorbent and to the use of such adsorbents. The modifier may be a single chemical compound or it may be a mixture of several compounds. When it is desired to prepare an adsorbent which selectively adsorbs a particular compound or class of compounds, it is first necessary to obtain a sample of the particular compound or the mixture or alternatively to obtain a sample of a compound which is chemically and physically closely related thereto. These samples, which are to be employed as modifiers, may be prepared synthetically or alternatively they may be segregated from mixtures containing them by independent methods. In one modification of the invention, the sample is obtained by the resolution of fluid mixture by adsorption with a conventional adsorbent for example.

In the usual method for the preparation of solid adsorbents by the method of this invention, an inorganic hydrogel is precipitated from a fluid medium containing the modifier. In the preferred method the modifier is introduced into the fluid medium in the form of a miscible liquid and the hydrogel and the modifier are simultaneously precipitated therefrom whereby an appreciable amount of the modifier is retained in and by the precipitated hydrogel. After the hydrogel has been washed and dried, the modifier is removed by solvent extraction, vaporization, steam stripping, decomposition, combustion, or the like.

By one particular modification of the invention, an adsorbent is prepared which possesses a high specificity and selectivity for the adsorption of nitrogen bases from petroleum oils and the like. In the method a sample of basic nitrogen compounds is dissolved in a dilute nitric acid solution, e. g., 5% by weight. This solution of nitrogen bases is then mixed with aqueous aluminum nitrate solution and the whole is precipitated by the addition of ammonium hydroxide. Both alumina gel and nitrogen bases are simultaneously precipitated by this procedure. In the preparation of a modified silica gel a solution of nitrogen bases in nitric acid is poured into a vigorously stirred hydrous silica sol for example whereupon the silica is precipitated and retains a portion of the nitrogen bases.

In another method for the preparation of modified gels nitrogen bases may be dissolved in an excess of a mineral acid and the resulting solution may be poured into a sodium silicate solution which is vigorously stirred. In this case the mineral acid employed is substantially equivalent to the sodium silicate employed so that the nitrogen bases and silica are simultaneously precipitated from the solution. Sodium aluminate, sodium titanate, sodium stannate, sodium molybdate, sodium vanadate, sodium tungstate and the like may be substituted for the sodium silicate so as to result in the formation of alumina, titania, stannia, molybdic oxide, tungsten oxide, vanadium oxide and the like gels in modified form.

In another method for preparing modified gels an acidic solution may be precipitated by the addition of a nitrogen base which also acts as a modifier. Thus collidines, pyridine, quinoline, quinaldine and the like may be employed to precipitate solutions of aluminum nitrate, aluminum chloride, magnesium chloride, ferric sulfate, copper sulfate, stannic chloride and the like leading to the formation of modified gels.

Following the simultaneous precipitation of the gel and the nitrogen bases the wet hydrogel is washed to remove inorganic ions and dried. Thereafter the nitrogen bases are removed from either the alumina hydrogel or the silica hydrogel by extraction with hot alcohol or other solvent for example. The oriented or modified adsorbent surface remains after the removal of the modifier.

Preferably the solid adsorbents of this invention are prepared via the precipitation of corresponding inorganic hydrogels. Thus adsorbents of this invention may be prepared from hydrogels such as titania, silica, alumina, magnesium oxide, magnesium hydroxide, iron oxide, copper oxide, thorium oxide, molybdic oxide, vanadium oxide, tungsten oxide, stannic oxide and the like. The preferred adsorbents are modified silica gel, alumina gel and mixtures of silica gel and alumina gel. These adsorbents in general have a high adsorptive capacity compared with most other gels and are therefore preferred. Furthermore, the preferred adsorbents are most markedly affected by the modifier in that the selectivity and specificity of the adsorbent are most evident therein. The other gels, while having appreciably lower adsorptive capacities, can nevertheless be prepared according to the method of this invention so as to have favorably high specificity.

In certain cases adsorbents may be prepared from organic materials such as from various organic polymers, gelatin and the like. In the preparation of such adsorbents, the polymer is formed by polymerization in the presence of a liquid containing the modifier, or the gelatin may be formed or precipitated in the presence of a modifier, for example.

Figure 1 presents data for the removal of collidines from a blend of nitrogen-free gas oil and collidines by adsorption on both modified and unmodified silica gel.

Figure 2:
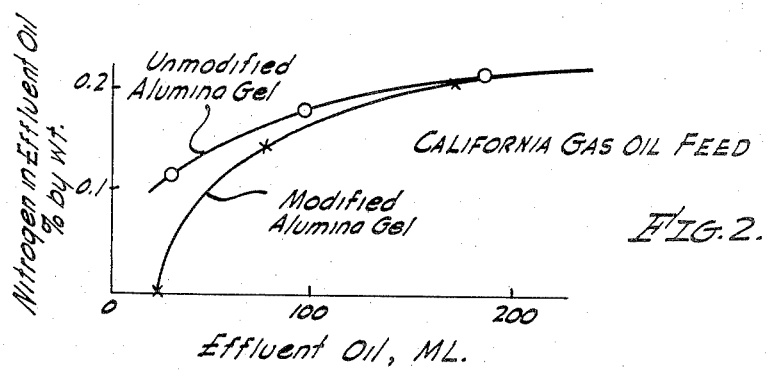

Figure 2 presents data for the separation of nitrogen compounds from a gas oil distillate from a California crude oil by adsorption on unmodified alumina gel and by adsorption on alumina gel which has been modified by inclusion of collidines.

Figure 3:
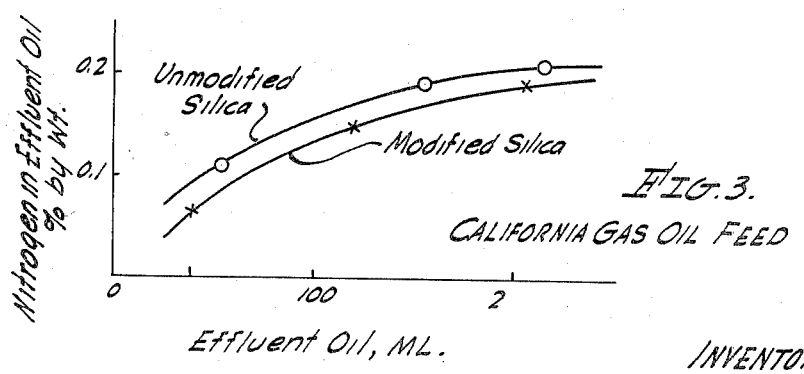

Figure 3 presents data for the separation of nitrogen compounds from a gas oil petroleum distillate by adsorption on an unmodified silica gel and by adsorption on silica gel which has been modified by inclusion of collidines.

Many compounds may be employed as modifiers for preparing and using the adsorbents of this invention. In general the use of oxygen, nitrogen, or sulfur compounds as modifiers produces adsorbents which show high specificity for the adsorption of oxygen, nitrogen, and sulfur compounds.

The greatest specificity is obtained where the modifier and the adsorbate are members of the same chemical series. Chemical series in this sense is employed to denote members of a homologous series, members of an analogous series, e. g., pyrrole, thiophene and furan wherein =NH, —S— and —O— are interchanged and members of a series of structural isomers for example. Thus the use of 2-methyl thiophene as a modifier yields an absorbent which would show high specificity for the adsorption of thiophene, 2-methyl thiophene, 2,3-dimethyl thiophene, 2,4-dimethyl thiophene, 2-methyl furan, 2-methyl pyrrole and the like.

Heterocyclic compounds containing an oxygen, nitrogen, or sulfur atom in the ring are considered members of a chemical series for purposes of this invention since the use of one of such compounds as a modifier gives an adsorbent having a high specificity for another compound of the chemical series.

Where it is desired to separate a particular group of nitrogen bases, an amine, substituted pyridine, substituted quinoline or the like may be employed as the modifier for the preparation of the adsorbent depending upon whether it is desired to adsorb selectively an amine, substituted pyridine, substituted quinoline or the like. Preferably the modifier is about the same molecular weight as the compound to be adsorbed selectively. In the preferred case the modifier, e. g., the nitrogen compound is identical with the compound to be separated by adsorption. Thus, if it is desired to separate collidines from a petroleum distillate a mixture of collidines is employed as the modifier during the precipitation of the adsorbent.

For the separation of nitrogen compounds from petroleum distillates, the adsorbent is prepared by using one or more of the following compounds as modifiers, for example: pyridine, methyl pyridines, dimethyl pyridines, ethyl pyridines, propyl pyridines, quinoline, methyl quinolines, isoquinoline, methyl isoquinolines, pyrrole, benzopyrrole, hexyl amine duodecyl amine, deheptyl amine, tributyl amine and the like. Where the compounds to be removed are primarily basic nitrogen compounds it is desirable to employ as modifiers those basic nitrogen compounds which contain between about 2 and 25 carbon atoms and preferably between about 4 and 16 carbon atoms. Pyridine, methyl pyridine, dimethyl pyridines, ethyl pyridines, propyl pyridines, quinoline, methyl quinolines, isoquinolines, methyl isoquinolines, hexyl amine, duodecyl amine, diheptyl amine, tributyl amine and the like may be employed in this case.

The modifier and adsorbate (adsorbed molecule) will generally contain between about 2 and 25 carbon atoms and preferably between about 4 to 16 carbon atoms.

The absorbent is prepared generally by the precipitation of water-soluble salts of the appropriate metals so as to form the corresponding hydrogels. In the case of alumina, the hydrogel is formed, for example, by treating sodium aluminate with carbon dioxide, for example. Alternatively, the alumina may be prepared by adding ammonium hydroxide to aqueous solutions of aluminum chloride, aluminum sulfate, aluminum nitrate and the like. In the case of silica, the hydrogel may be prepared by adding an electrolyte or a solvent possessing an affinity for water, e. g. alcohol, to a sol of silica which has been prepared by conventional methods. Suitable sols for this purpose in general contain between about 1% and 30% or more by weight of $SiO_2$. Alternatively, the silica may be prepared by the precipitation of sodium silicate solutions by the addition of carbon dioxide. Where it is desired to prepare an adsorbent containing both silica and alumina this is accomplished, for example, by treating an appropriate mixture of sodium aluminate and sodium silicate in water with carbon dioxide.

In practicing the method of this invention the added compound is introduced into the mixture prior to the precipitation of the adsorbent. The added compound may be introduced as a solution, an emulsion or as an intimate dispersion of the compound in a suitable liquid dispersing medium. In the preferred modification the compound is dissolved in a suitable solvent which is preferably miscible with the fluid system to be employed for the precipitation. In the preferred method the added compound is simultaneously precipitated from the mixture along with the solid adsorbent.

In one modification of the invention wherein nitrogen bases are employed, the nitrogen bases are dissolved in an acid solution and are added to the liquid medium to be employed for precipitation. Where the precipitating agent is ammonia or the like, the hydrogel and the nitrogen bases are simultaneously coprecipitated by this method.

In another modification of the invention the added compound is emulsified with a small amount of an emulsification agent which is preferably of the non-ionic type. Suitable emulsification agents include alkylated aryl polyether alcohols, polyoxyethylene N-substituted fatty acid amides, resin acid esters of polyethylene glycols, polyoxyethylene alkyl tertiary amines, and the like. Usually between about 0.5% and 5% by weight of such agent is employed based on the weight of the modifier.

In still another modification of the invention the compounds may be dissolved in suitable solvents and dispersed in the liquid medium prior to the precipitation of the adsorbent. For example, nitrogen compounds from petroleum, which include relatively non-basic nitrogen compounds as well as nitrogen bases, may be dissolved in a suitable non-polar solvent and the mixture intimately dispersed in the adsorbent precipitation solution. This method has an accompanying disadvantage in that the solvent sometimes exerts a powerful modifying action of its own which masks that of the solute.

The amount of the modifier employed during the precipitation may vary within wide limits, depending on the degree of specificity which is required and the nature of the modifier. It has been found that in the case of each adsorbent an apparent saturation of modifier is obtained at a characteristic amount for the particular combination. This is manifest from the observation that an increase in the amount of modifier employed, after a certain point will no longer change the specificity. Thus in the case of a modified silica gel which was prepared by the addition of a solution of collidines in nitric acid to a sol of silica, it was found that the use of 10% by weight of collidine gave a greatly improved adsorbent for separating collidines from petroleum distillates when compared with a corresponding unmodified preparation. The use of 30% by weight of collidine in the preparation of a second modified gel gave an adsorbent which was only slightly better than the sample prepared with only 10% by weight of collidines.

In general it has been found most desirable to employ between about 5% and 30% by weight of the modifier based upon the weight of the dried inorganic gel. When greater or lesser specificity is desired the modifier may vary between about 0.5% and 100% by weight of modifier based upon the weight of the inorganic gel after drying.

The adsorbents of this invention are employed in substantially the same manner as conventional adsorbents. In general the adsorbent is contacted with a liquid containing a mixture of compounds, one or more of which is to be separated therefrom. The adsorbent selectively removes the one or more compounds from the mixture and retains them in an adsorbed state. The solid adsorbent is separated from the non-adsorbed liquid and the adsorbed substances thereon are separated subsequently.

In one method for removing the adsorbed substances elution may be employed, wherein eluents are contacted with the adsorbent to displace the adsorbed material. Thus in the case of an adsorbent containing adsorbed nitrogen compounds, for example, a low molecular weight alcohol may be successfully employed to displace the adsorbed phase. The nitrogen compounds pass into the liquid alcohol while the adsorbent adsorbs a portion of the alcohol. The adsorbent is regenerated by steam stripping, water washing followed by drying, or the like. The nitrogen compounds are separated from the alcohol by distillation or other suitable means. In the use of eluents low molecular weight volatile eluents are preferably employed since these are removable by steam stripping. Suitable eluents include methyl alcohol, ethyl alcohol, propyl alcohol, water, and the like where the compound to be removed is a hydrocarbon, a sulfur compound or a nitrogen compound. For the removal of oxygen compounds the foregoing alcohols may be employed with the exception of the case wherein the alcohol itself is the adsorbed phase, in which case simple stripping is employed to separate the adsorbed phase from the adsorbent.

Perhaps the process of this invention can best be understood by reference to the following specific examples.

EXAMPLE I

About 213 grams of an isomeric mixture of collidines (molecular weight 121.2) was dissolved in a solution of 114 ml. of concentrated nitric acid and 1 liter of distilled water.

About 2610 grams of a commercially available silica sol containing about 30–31% by weight of $SiO_2$ was dissolved in about 3 liters of distilled water.

The collidine solution was added to the silica sol during a ten minute period and with vigorous agitation of the silica sol. A gel is formed by the addition. The gelled mixture was stirred for one-half hour, filtered, washed three times with 3 liter portions of distilled water, dried at about 110° C., crushed and screened. The 28 to 35 mesh grade was selected for testing and was extracted with ethanol in a Soxhlet extractor for 16 hours. After the extraction the alcohol-wetted adsorbent was dried in a 110° C. oven for 24–28 hours during which time a constant weight was reached.

An unmodified gel was prepared by adding a solution of about 52.2 grams of ammonium nitrate in 500 ml. of water to about 2610 grams of the silica sol (30–31% $SiO_2$ by weight). The mixture was stirred for one minute and allowed to stand. After 10–15 minutes a gel formed which was filtered, washed, dried, crushed, screened and extracted as in the case of the modified gel.

A synthetic feed stock was prepared for the evaluation of the treated silica gel by mixing gas oil from an Eastern Texas crude which was substantially nitrogen-free (0.012% N by weight) and boiled in the range of about 400° F. to 700° F. with about 2.82% by weight of the same isomeric mixture of collidines which was used in the preparation of the modified adsorbent.

In testing the modified and unmodified silica gels about 40 g. of each gel was placed in a glass tube to form a column of gel. The gas oil-collidine feed stock was percolated therethrough at a controlled rate of about 1.91 ml./minute and successive samples of the effluent liquid from the bottom of the column were taken and analyzed to determine their nitrogen content. In plotting the results the value of the nitrogen content of the fraction was assumed to be that of the mid-point of the particular cut taken. The following data were obtained and are in part plotted in Figure 1.

*Silica adsorbent, gas oil-collidine feed*

| Effluent Oil, ml. | Weight Percent Nitrogen in Effluent Oil | |
|---|---|---|
| | Unmodified Adsorbent | Modified Adsorbent |
| 0 to 40 | nil | nil |
| 40 to 80 | 0.036 | nil |
| 80 to 140 | 0.311 | 0.117 |
| 140 to 220 | 0.317 | 0.331 |
| 220 to 290 | 0.332 | 0.332 |

Reference to Figure 1 clearly shows that the modified silica adsorbent was more effective for adsorbing collidines from the gas oil-collidine mixture than was the unmodified silica gel under the same conditions. The unmodified gel retained about 6.08 milligrams of combined nitrogen per gram when saturation had been reached, while the modified gel retained about 8.22 milligrams of combined nitrogen per gram when saturation was reached.

EXAMPLE II

About 1501 grams of aluminum nitrate nonahydrate (4 moles) was dissolved in about 4 liters of distilled water. About 75 grams of mixed collidines (0.62 mole) was dissolved in about 500 ml. of water containing 39.1 grams (0.62 mole) of concentrated nitric acid.

The collidine solution was added to the aluminum nitrate solution with stirring. About 442 grams of concentrated ammonium hydroxide (12.62 moles) was added to the mixture with stirring. The mixture gelled with alumina gel and collidines being simultaneously precipitated. About 1 liter of water was added and the stirring was continued. About 20 grams more ammonium hydroxide was added and mixed. The gel was filtered, washed with dilute ammonia, dried at 110° C., crushed and screened. The screened gel was extracted with alcohol in a Soxhlet extractor to remove the collidines from the gel. The alcohol-wetted gel was dried at 110° C. to remove the alcohol.

An unmodified gel was prepared in substantially the same manner with the exception that the mixture of collidines was omitted from the preparation.

A gas oil distillate from a California crude was obtained for testing the modified and unmodified adsorbents. The distillate contained about 0.218% by weight of combined nitrogen, boiled in the range between about 400° F. and 760° F., and had an API gravity of about 28°.

The gas oil was percolated through respective beds of the two adsorbents in a manner similar to that described in Example I. The effluent oil was analyzed to determine the nitrogen content. In plotting the data it was assumed that the nitrogen content of the sample was representative of the mid point of the cut. The following data were obtained and are in part plotted in Figure 2.

*Alumina adsorbent, California gas oil feed*

Weight Percent Nitrogen in Effluent Oil

| Effluent Oil, ml. | Unmodified Adsorbent |
| --- | --- |
| 0 to 60 | 0.114 |
| 60 to 130 | 0.181 |
| 130 to 240 | 0.216 |
| 240 to 350 | 0.216 |
| 350 to 460 | 0.214 |

| Effluent Oil, ml. | Modified Adsorbent |
| --- | --- |
| 0 to 50 | 0.058 |
| 50 to 110 | 0.147 |
| 110 to 230 | 0.208 |
| 230 to 340 | 0.212 |
| 340 to 450 | 0.215 |

Reference to Figure 2 shows that the modified alumina adsorbent was more effective for adsorbing indigenous nitrogen compounds from the gas oil than was the unmodified alumina gel.

EXAMPLE III

Modified and unmodified silica adsorbents were prepared according to the method of Example I using only 10% by weight of collidines as modifier based on the weight of the silica. The two adsorbents were tested for removing nitrogen from the California gas oil according to the procedure described in Example II. The following data were obtained which are in part plotted in Figure 3.

*Silica adsorbent, California gas oil feed*

PERCENT NITROGEN IN EFFLUENT OIL

| Effluent Oil, ml. | Unmodified Adsorbent |
| --- | --- |
| 0 to 110 | 0.110 |
| 110 to 210 | 0.191 |
| 210 to 320 | 0.212 |
| 320 to 430 | 0.219 |
| 430 to 520 | 0.220 |
| 440 to 640 | 0.221 |
| 640 to 730 | 0.216 |
| 730 to 800 | 0.217 |

| Effluent Oil, ml. | Modified Adsorbent |
| --- | --- |
| 0 to 80 | 0.063 |
| 80 to 160 | 0.145 |
| 160 to 250 | 0.192 |
| 250 to 370 | 0.205 |
| 370 to 490 | 0.214 |
| 490 to 580 | 0.213 |
| 580 to 690 | 0.217 |
| 690 to 800 | 0.214 |

The foregoing data and Figure 3 again show that the modified gel is superior to the unmodified gel for removing indigenous nitrogen compounds from gas oil.

EXAMPLE IV

For the preparation of a modified titania gel about 200 grams of titanium tetra-chloride is dissolved in about 200 grams of concentrated hydrochloric acid. The resulting mixture is then poured rapidly into a rapidly stirred dispersion of about 2 kilograms of quinoline and 2 kilograms of water. When the resulting gel is washed, dried and extracted with ethanol to remove quinoline, it is found that the resulting modified gel is more selective and has a higher capacity for removing nitrogen from the feed stock of Example I than a corresponding gel prepared by using ammonium hydroxide for precipitating the titania gel in place of the quinoline.

EXAMPLE V

A stannic oxide gel is prepared by adding stannic chloride to an excess of hexyl amine in water. The resulting gel after washing, drying, and extraction to remove the retained hexyl amine, is more efficient and more selective for removing nitrogen from the feed stock of Example I than a corresponding gel prepared by substituting ammonium hydroxide for the hexyl amine.

EXAMPLE VI

A modified silica gel is prepared by pouring hydrochloric acid into a rapidly stirred mixture of sodium silicate and pyrrole. The pyrrole amounts to 5% by weight of the silicate calculated as $SiO_2$. The resulting gel is washed, dried, and extracted with ethanol to remove the retained pyrrole. The modified gel is more selective for removing pyrrole from a mixture of 2% pyrrole and 98% n-heptane than is a corresponding unmodified gel prepared in the absence of pyrrole.

EXAMPLE VII

A California gas oil containing about 0.219% by weight of combined nitrogen was passed through a bed of commercial magnesium silicate adsorbent which retained about 94% by weight of the combined nitrogen. The adsorbent was washed with pentane to remove the major portion of the adsorbed hydrocarbons. The adsorbed nitrogen compounds retained on the pentane-washed adsorbent were eluted with methanol. The methanol was then removed from the eluted nitrogen compounds by vacuum stripping. The resulting nitrogen-rich oil contained about 2.1% by weight of nitrogen.

A portion of the nitrogen-rich oil is then intimately mixed into a rapidly stirred mixture containing water and sodium silicate wherein the weight of the oil is about 5% by weight of the silicate as SiO₂. An amount of 10% hydrochloric acid which is equivalent to the sodium silicate is then poured into the mixture. The resulting gel is washed, dried, and extracted with ethanol to remove the retained oil. The modified gel prepared by this method is found to be more selective for removing nitrogen compounds from another sample of the gas oil than is an unmodified gel which is prepared without inclusion of the nitrogen-rich oil.

EXAMPLE VIII

A portion of the nitrogen-rich oil isolated in Example VII is mixed with about 2% by weight of the n-substituted amides of oleic acid having the structure

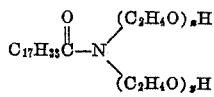

wherein $x+y$ is about 50 and $x$ is approximately equal to $y$ on the average. The mixture is heated to about 50–60° C. for a short time with stirring. About 100 parts by weight of a silica sol, containing about 30% by weight of SiO₂, is heated to about the same temperature and is then mixed with about 1.5 parts by weight of the nitrogen-rich oil-emulsifier mixture. The mixture is then passed through a homogenizer to complete the dispersion. About 20 parts by weight of 10% aqueous ammonium nitrate is added to cause the gelling. The resulting gel is washed, dried, extracted with methanol to remove the retained oil and dried. The modified gel is found to be more selective for removing nitrogen compound from a sample of the original gas oil than is the unmodified silica gel prepared in Example I.

It is apparent therefore that in broad aspect this invention encompasses the formation of a new class of adsorbents which are selective for the adsorption of specific compounds or classes of compounds. Thus sulfur, nitrogen, or oxygen-containing compounds may be employed as modifiers to prepare adsorbents which are in general specific for sulfur, nitrogen, and oxygen-containing compounds and which are highly specific for the adsorption of closely related compounds.

The foregoing disclosure of this invention is not to be considered as limiting since many variations may be made by those skilled in the art without departing from the scope or spirit of the following claims.

I claim:

1. An adsorption process which comprises contacting a solid inorganic oxide adsorbent with a hydrocarbon distillate containing an adsorbable organic nitrogen base, selectively adsorbing said nitrogen bases on said adsorbent, and separating the unadsorbed portion of said hydrocarbon distillate from said adsorbent, wherein said adsorbent has been prepared by precipitation in the presence of an organic nitrogen base modifier, said modifier and said adsorbable organic nitrogen base being members of the same homologous chemical series, each containing between about 2 and 25 carbon atoms.

2. A process for removing an adsorbable heterocyclic nitrogen base from a hydrocarbon oil which comprises contacting said oil with an adsorbent inorganic oxide gel, wherein said inorganic oxide gel has been prepared by precipitation from an aqueous solution in the presence of a heterocyclic nitrogen base, belonging to the same chemical series as said adsorbable heterocyclic nitrogen base, followed by draining and washing to remove said heterocyclic nitrogen base, followed by drying at low temperatures.

3. A process as defined in claim 2 wherein said inorganic oxide gel is silica gel.

4. A process as defined in claim 2 wherein said inorganic oxide gel is alumina gel.

5. A process for removing nitrogen bases from a hydrocarbon oil which comprises contacting said hydrocarbon oil with an adsorbent inorganic oxide gel, wherein said inorganic oxide gel has been prepared by precipitation from an aqueous solution in the presence of a modifier, said modifier and said nitrogen bases belonging to the same chemical series.

6. A process according to claim 5 wherein said nitrogen bases and said modifier consist predominantly of compounds containing a heterocyclic nitrogen ring.

7. A process according to claim 5 wherein said nitrogen bases and said modifier consist predominantly of compounds containing a pyridine ring.

References Cited in the file of this patent

UNITED STATES PATENTS

| | | |
|---|---|---|
| 1,809,862 | Moorman et al. | June 16, 1931 |
| 2,441,572 | Hirschler et al. | May 18, 1948 |
| 2,499,680 | Plank | Mar. 7, 1950 |
| 2,532,497 | Hoekstra | Dec. 5, 1950 |
| 2,552,323 | Kimberlin | May 8, 1951 |
| 2,585,490 | Olsen | Feb. 12, 1952 |

OTHER REFERENCES

Holzappel et al.: Chem. Zentr. (1943), II, page 1348.
Bancroft: "Applied Colloid Chem.," 2nd ed. (1926), page 136.
Jour. Am. Chem. Soc., vol. 72, pp. 1554–60 (April 1950) (article by Mills et al.).